(12) United States Patent
Sudo et al.

(10) Patent No.: US 7,087,166 B1
(45) Date of Patent: Aug. 8, 2006

(54) FILTER ELEMENT AND FILTER DEVICE HAVING REPLACEABLE FILTER

(75) Inventors: Kazunori Sudo, Tokyo (JP); Yoshiki Nomura, Chiba-ken (JP)

(73) Assignee: Entegris, Inc., Chaska, MN (US)

( * ) Notice: Subject to any disclaimer, the term of this patent is extended or adjusted under 35 U.S.C. 154(b) by 856 days.

(21) Appl. No.: 09/968,225

(22) Filed: Oct. 1, 2001

(51) Int. Cl.
*B01D 27/14* (2006.01)

(52) U.S. Cl. .................... 210/232; 210/315; 210/323.2; 210/338; 210/342; 210/493.2; 210/497.01

(58) Field of Classification Search ............... 210/315, 210/321.77, 321.86, 323.2, 338, 342, 458, 210/489, 493.2, 497.01, 232, 316, 321.64, 210/621.78, 321.87; 55/496
See application file for complete search history.

(56) References Cited

U.S. PATENT DOCUMENTS

| 3,262,570 A | 7/1966 | Gailitis et al. |
| 3,334,752 A | 8/1967 | Matravers |
| 3,552,553 A | 1/1971 | Reading |
| 5,980,759 A | 11/1999 | Proulx et al. |

FOREIGN PATENT DOCUMENTS

| BE | 534851 | 1/1955 |
| JP | 7-213814 | 8/1995 |
| JP | 7-323217 | 12/1995 |
| JP | 407323217 A | 12/1995 |

OTHER PUBLICATIONS

International Search Report for PCT/US02/30495, mailed Jan. 3, 2003.

*Primary Examiner*—Matthew O. Savage
(74) *Attorney, Agent, or Firm*—Timothy J. King; Paul J. Cook

(57) ABSTRACT

Providing a filter device with various functions, such as remarkable improvement of the throughput of the downstream filter, ion-removing property of the upstream filter. A filter element comprises an upstream filter and a downstream filter made of the same or different material and installed into one housing or container, wherein said downstream filter is fixed to said housing, said upstream filter is fixed to said downstream filter, both filters are concentrically arranged to each other, and when the downstream filter is not contaminated, only the upstream filter can be replaced with fresh one.

6 Claims, 9 Drawing Sheets

FILTER ELEMENT AND FILTER DEVICE HAVING REPLACEABLE FILTER

This application claims priority to Japanese Patent Application Ser. No. 2001-216452, filed Jul. 17, 2001.

BACKGROUND OF THE INVENTION

The present invention relates to a filter cartridge which is suitable for filtering liquid and gas. More particularly, the present invention relates to a filter cartridge for filtering a liquid agent containing large amounts of various foreign matters, such as an amine-type organic release agent used on a substrate for electronic parts (e.g. a semiconductor wafer and a glass substrate for a liquid crystal device); a pigment-dispersion photoresist for a glass substrate of a liquid crystal device; a slurry for a chemical and mechanical abrasion device; and other liquids used in general industry.

Two different and specific basic cartridges generally used for filtering gas and liquid are a depth filter (representatively a roll type filter) and a membrane filter (usually a pleated filter). Today, roll type depth filters and membrane filters each encased in a separate housing are used in tandem to attain a desired purification level. In Japanese Patent Application Kokai No. 7-213814, a filter cartridge is proposed that has a filter body comprising: a depth filter containing non-woven fiber mass in the form of either roll or seamless fiber cylinder; and a pleated screen filter or a surface filter that can be encased in the same housing with the depth filter. However, there are still demands for combinations of filters that can attain specific properties, such as increasing throughput and removing metal ions. By separately providing filters each as a unit that can be combined to each other, production cost can also be reduced.

FIGS. 1 and 2 show a conventional filter cartridge disclosed in Japanese Patent Application Kokai No. 7-213814. A cartridge 10 has a depth filter 16 having an exposed outer surface 12, in the form of roll or seamless fiber cylinder; a pleated surface filter or screen filter 18 concentrically arranged in within the depth filter; a core 20 supporting the inner surface of the surface filter 18 as well as having a number of holes 23 as fluid passages; and a fluid outlet 14 for withdrawing a filtrate fluid (liquid or gas) from the core 20. The top end of the depth filter 16 and that of the surface filter 18 are sealed. The top end of the filter cartridge 10 is completely sealed with a cap 19. Upon its use, the filter cartridge 10 is inserted into a housing 21 of a filter device, and liquid-tightly fixed to the wall of the housing via a thread means and/or an O-ring provided around the fluid outlet 14.

A fluid (liquid or gas) to be purified is introduced between the housing 21 and the cartridge 10, and the fluid passes from the outer surface 12 towards the inside of the depth filter 16, and then through the surface filter 18. The purified fluid flows out to the central passage through the holes 23 of the core 20, and is withdrawn as a filtrate from the fluid outlet 14.

In the above-mentioned case in which two different filters are used, the filter located upstream has relatively large pore diameter, while the filter located downstream has relatively small pore diameter, in order to increase the level of purification and to elongate the life of the filter.

However, the above-mentioned two filters are integrally formed to be a single filter element, and have disadvantages in that various possible filter combinations should be prepared that satisfy various purposes. In addition, the upstream filter is contaminated faster as compared with the downstream filter, and thus even when the downstream filter is not contaminated, the filter element cannot be used anymore, because of the shorter life of the upstream filter.

Therefore, the object of the present invention is to provide a filter cartridge comprising an upstream filter unit and a downstream filter unit, wherein both units can be combined to each other so that the upstream filter locates between the downstream filter and the housing to form a cartridge and the combination can be properly selected depending on the purpose such as the removal of metal ions and can elongate the filter life.

The present invention provides a filter element comprising a combination of an upstream filter and a downstream filter, wherein the upstream filter is replaceable. As the result, the life of the downstream filter is elongated while attaining the required purified level, and in addition, smaller number of filters is required in order to obtain the same amount of filtrate as that in the case of the conventional filter.

The present invention also provides a filter element comprising an upstream filter and a downstream filter, each of which is properly selected depending on the specific purposes, from the stock of various filters expected to be used in various applications. The upstream filter should be replaceable, although it may be integrally formed as a part of a disposable filter device, if necessary.

Specifically stated, the preset invention provides a filter element comprising an upstream filter and a downstream filter, wherein said downstream filter has a means for fixing to a housing, and said upstream filter is fixable to said downstream filter fixed to said housing; and a filter device containing said filter element fixed to the housing.

In one embodiment, the downstream filter has a first thread part, and the housing has a second thread part which engages with the first thread part.

In another embodiment, the downstream filter is integrally formed with the housing.

In still another embodiment, the upstream filter is fixed to the downstream filter via fitting.

Preferably, the upstream filter and the downstream filter are in the form of cylinder and so arranged that one nests in the other.

The upstream and downstream filters may have the same or different filter membrane selected from the group consisting of a pleated type, roll type or seamless fiber cylinder type depth filter containing nonwoven fiber mass; and a porous foam, hollow fiber or pleated membrane filter. A roll type filter may comprise various kinds of filter bodies rolled together, and the roll type filter may also have a density gradient.

The upstream filter may be a member selected from a set of filters, which set is different from a set from which a member is selected as a downstream filter.

The present invention also provides a filter device containing the above-mentioned filter element.

The upstream filter comprises, in the order from inside, a porous inner support cylinder made of resin (core), and a filter body in the form of sheet rolled around the core. If necessary, the upstream filter further comprises an outer support cylinder made of resin (sleeve) or alternatively a resin net, which surrounds the filter body. The top edge and the bottom edge of the upstream filter are sealed with resin caps.

On the other hand, the downstream filter comprises, in the order from inside, a porous inner support cylinder (core), a filter body surrounding the core, and a porous outer support cylinder (sleeve) or alternatively a net, which supports the outer surface of the filter body. The top edge and the bottom edge of the downstream filter are sealed with resin caps.

The combination of filters that comprises the filter body can be properly selected depending on the purpose. The upstream filter has a filter body comprising a pleated type, roll type or seamless fiber cylinder type depth filter containing non-woven fiber mass; and a porous foam, hollow fiber or pleated membrane filter. The upstream filter locates upstream the downstream filter in the housing, and it may not be mechanically combined with a downstream cartridge, although it is preferred that both ends of the upstream filter be sealed with caps having the structure which can be mechanically and liquid-tightly combined with the downstream cartridge.

The downstream filter is a filter cartridge having a filter body comprising a pleated type, roll type or seamless fiber cylinder type depth filter containing non-woven fiber mass; and a porous foam, hollow fiber or pleated membrane filter. One end of the downstream filter is sealed with a cap, while the other end is sealed with a cap having a fluid inlet or a fluid outlet. Each of the caps may be combined with the upstream filter via a twist-lock, an O-ring, and/or a thread. However, it may not necessarily be combined.

The materials for the filter body used for the upstream and downstream filters can be selected from those known in the art. Examples include PP (polypropylene), PTFE (polytetrafluoroethylene), UHMWPE (ultra-high molecular weight polyethylene), PE (polyethylene), HDPE (high-density polyethylene), PES (polyether sulfone), nylon, polyester, PVDF (polyvinylidene fluoride), cellulose and SUS (stainless steel). The inside and outside support cylinders of the upstream and downstream filters are made of rigid resin. When a net is used instead of the support cylinder, it can be made of the same material. The top and bottom caps may be in the form of ring or disk, depending on the position at which they are used. They are fused by heat with the top or bottom edge of the laminated structure composed of the inner and outer cylinders (or parts of the net) and the filter body. The material for the caps is also selected from those known in the art.

EXAMPLE

The present invention will be explained in detail in the following. The term "filter element" means the combination of an upstream filter and a downstream filter; the term "filter device" means a device in which a filter element is installed into a housing to form a usable device, the term "upstream" means the relative position with respect to the gas or liquid flow (feed) to be purified. As will be described below, a part of the feed can be led directly into the downstream filter, depending on the required cleanliness for the purpose.

Example 1

FIGS. 3–6 illustrate the filter element and the filter device according to Example 1 of the present invention. In the descriptions of the figures, the terms "top" and "bottom" are used for the sake of convenience, and the axis line can be set to an arbitrary direction, such as the horizontal direction.

FIG. 3 shows a filter device 32 of the present invention in which a filter element 30 (see FIG. 6) of the present invention is installed. FIG. 4 shows a perspective view of an upstream filter 34, FIG. 5 shows a perspective view of an downstream filter 36, and FIG. 6 shows a filter element in which the upstream filter 34 is partially inserted into the downstream filter 36.

Referring to FIGS. 3 and 4, the upstream filter 34 has a filter body 38 comprising a pleated type, roll type or seamless fiber cylinder type depth filter containing non-woven fiber mass; and a porous foam, hollow fiber or pleated membrane filter. All of these filter body types are known in the art, and the description can be found, for example, in the above-mentioned references. The upstream filter 34 is located upstream of the downstream filter in the housing, and it may not be liquid-tightly combined with the downstream filter (i.e. bypassing may occur which allows a small amount of flow), or if higher purification is required, it can be liquid-tightly combined with the downstream filter 36 (i.e. there is no bypass to the downstream filter). The figures illustrate the former, and the top end of the filter body 38 is sealed with an annular cap 44 made of resin, and the bottom end is sealed with an annular cap 42 made of resin. The inner surface of the cap 42 has two projections 46 at diametrically opposite positions for fixing the upstream filter 34 to the downstream filter 36. If the bypass of the feed to the downstream filter 36 is required to be blocked, the top and bottom ends of the caps 42 and 44 are sealed using O-rings.

Along the inside and/or the outside of the filter body 38 in the form of cylinder, porous support cylinder or cylinders made of rigid resin can be placed, and the top and the bottom ends can be integrally combined to the caps 42 and 44, respectively. The figures contain a thin support cylinder 43 located inside the upstream filter.

Referring to FIGS. 3 and 5, the downstream filter 36 is a filter cartridge having a filter body 48 comprising a pleated type, roll type or seamless fiber cylinder type depth filter containing non-woven fiber mass; and a porous foam, hollow fiber or pleated membrane filter. The top end thereof is sealed with an annular cap 52, and the bottom end is sealed with a cap 50. Each of the caps may be combined with the upstream filter by means of a twist-lock, an O-ring, and/or a thread. However, depending on the required degree of purification, the filters may not be mechanically combined together and the upstream filter 34 may merely cover the downstream filter 36. Along at least the inner side of the filter body 48 among the inner side and the outer side, rigid support cylinder(s) having a number of circulatory holes 56 is provided. In this embodiment, along both surfaces of the filter body 48, the rigid outer support cylinder 54 and the rigid inner support cylinder 62 are provided, and the top and bottom ends of the cylinders are integrally combined to the caps 52 and 50 respectively. On the cap 52, a filtrate outlet 60 is formed having an O-ring for air-tightly or liquid-tightly fixing the downstream filter to the housing 70 (FIG. 3). The outlet is connected to the inside of the inner support cylinder 62.

The circumference of the cap 50 has two twist-lock grooves 58, each of which accommodates the projection 46 of the upstream filter 34. The introduction part of each of the twist-lock grooves has a wide opening which accepts the projection 46 in the direction of the axis, and a locking groove 64 connected to the opening is formed, which locks the projection 46 when the upstream filter is rotated.

In FIG. 6, the inner downstream filter 36 is in the middle of the insertion into the outer upstream filter 34. These two filters constitute a filter element 30. They are installed into the predetermined position, and the projections 46 of the upstream filter 34 are inserted into the twist-lock grooves 58 of the downstream filter 36, and the upstream filter 34 is rotated, thereby engaging the projections 46 with the locking grooves 64. FIG. 3 shows a condition in which both filters are combined at the determined position. Except the initial installation, the upstream filter 34 and the downstream filter 36 are replaced by the fresh ones at the work site of filtration, and the upstream filter 34 is likely to be replaced more frequently as compared with the downstream filter 36.

FIGS. 7 and 8 illustrate one embodiment of the upstream filter 34 and the downstream filter 36. In this embodiment, the upstream filter 34 comprises, in the order from the inside, an inner support cylinder 43 having pores 45 and a roll type filter body having pores, rolled around the inner support cylinder 43. The downstream filter 36 comprises, in the order from the inside, an inner support cylinder 62 having holes 56, a pleated type filter body 48 surrounding the inner support cylinder 62, and an outer support cylinder 54 having pores 55, supporting the outer surface of the pleated filter body 48.

Various constructions of filter bodies can be properly selected, depending on the purpose.

As shown in FIG. 3, the housing 70 has a housing bowl 71 wherein the top end thereof is opened and the bottom end thereof is closed except a drain outlet 80. The top end of the housing can be air-tightly or liquid-tightly engaged to a round wall of a housing head 74 via an O-ring. The outer surface of the round wall of the housing head 74 has an external thread, to which an internal thread of a fastening ring 72 is engaged. When the fastening ring is loosened and the hosing bowl 71 is removed, the upstream filter 34 and the downstream filter 36 become accessible for replacing by fresh ones.

Referring to FIG. 3, the feed flows from the inlet 76 of the housing head 74 to the Space between the upstream filter 34 and the housing bowl 71, and then passes through the filter body 38. The unfiltered portion of the feed flows to the bottom of the housing bowl 71 and is discharged from the drain outlet 80 as a drain flow. In this case, a portion of the feed may be bypassed and flows directly around the downstream filter 34, but depending on the purpose, this is allowable. If necessary, O-rings can be placed between the annular caps 44 and 52, and between the annular caps 42 and 50, in order to prevent the formation of bypass, as mentioned above. The semi-filtrate that has been passed through the filter body 38 is then passed through the filter body 48 of the downstream filter 36 and further purified. The filtrate flows into the inner porous support cylinder 62, and exits from the filtrate outlet 78 of the housing head 74. Clogging of the downstream filter 36 is not likely to occur, while clogging of the upstream filter 34 occurs easily. Therefore, the flow rate of the filtrate is measured while watching clogging of the upstream filter 34, and when the upstream filter 34 is considered to have been clogged, the flow is paused and the housing bowl 71 is removed to replace the upstream filter with fresh one. In order to facilitate the replacement of the filter, the housing 70 and the housing head 74 are engaged together via an )-ring, and a the internal thread of the fastening ring 72 is screwed into the external thread of the housing head 74, thereby allowing the opposite end of the fastening ring to urge the housing against the edge of the housing head 74. Experiments were carried out housing the filter element and the filter device of this embodiment. As a filter body of the upstream filter, a five-layered roll filter obtained by rolling up a non-woven sheet made of PP (polypropylene), having a film thickness of 380 Experiments were carried out housing the filter element and the filter device of this embodiment. As a filter body of the upstream filter, a five-layered roll filter obtained by rolling up a non-woven sheet made of PP (polypropylene), having a film thickness of 380 manufactured by Mykrolis Corporation) in which a membrane made of 0.05 μm UHMWPE (ultra-high molecular weight polyethylene) was used. As a testing fluid, water containing 500 ppm of AC fine test dust was used. The filtration was conducted at the pressure difference of 55 kPa. The lowering of the filtration performance of the upstream filter due to the clogging was measured, and immediately before the clogging, the operation was paused. The upstream filter was replaced by fresh one, and the operation was resumed. The result is as follows. The filtration was conducted with three replacements and four 8-minutes operations, and the total amount of filtrate was 3.5 times as much as the amount when only one filter is used. When the conventional disposable filter element is used and filtration is operated four times, four filter elements are required, i.e., the amount to be filtered will be four times as much as the amount with one filter. Therefore, when the filtration is conducted four times, the filter element of the present invention can attain approximately 87% of the amount of filtrate using the conventional filter element (3.5 times/4 times), though with respect to the number of downstream filters, only 25% of the Conventional filter is required (1 downstream filter/4 filter elements). Especially in the case of downstream filter in which an expensive fine membrane is used as a filter body, the present invention is effective.

As shown in FIGS. 9 and 10, the upstream filter can be joined to housing head 74 by means of a filtrate outlet having screw threads 75.

In addition, the present invention is advantageous in that, by preparing various kinds of upstream filters 34 and downstream filters 36 and combining those, various filter element can be obtained depending on the purpose.

Various modifications can be made in the scope of the present invention.

In the embodiment of the present invention, the upstream filter 34 is placed outside the downstream filter 36. However, modification can be made by properly changing the flow route and the downstream filter may be placed outside the upstream filter.

In the embodiment of the present invention, an O-ring is provided on the outlet 60 of the downstream filter 36, for fixing the downstream filter to the housing. However, the downstream filter can be connected using only the O-ring. In this case, it is simply a tight-fit. Depending on the situation, the downstream filter can be integrally formed with the housing. In this case, the downstream filter is disposable.

Further in the embodiment, the upstream filter is loosely connected with the downstream filter, and bypassing to the downstream filter may occur, though the amount is small. To block the bypass, a disk-shape cap can be used to seal the bottom end of the upstream filter 34, instead of the annular cap 42, or O-rings can be placed around the caps 42 and 44 as mentioned above, so that the spaces between the caps 42 and 50, and between the caps and 52 are sealingly closed.

In another modified embodiment, a group consisting of plurality of the upstream filter and a group consisting of plurality of the downstream filter are prepared, and a combination of the upstream filter and the downstream filter can be properly selected depending on the purpose. Both filters can be fixed to the same sealing cap. In this case, the upstream filter cannot be replaced, thus it is disposable type. However, a combination of the upstream filter and the downstream filter composing the filter element of the present invention is properly selected depending on the purpose, which provides advantages in that various kinds of filter device having designated purpose can be attained effectively.

By using the filter element and the filter device having the above-mentioned features, long-term usage of the downstream filter becomes possible, which has been impossible with one conventional housing. In addition, a group of the upstream filter and a group of the downstream filter is prepared and, two filters each selected from different groups are used in combination. As a result, a user or an installer of the filter can properly select the filter combination and the filter can be replaced at any time It is also possible to render additional property to an upstream filter, such as ion removing ability.

DESCRIPTION FOR NUMERALS

Figure 1:
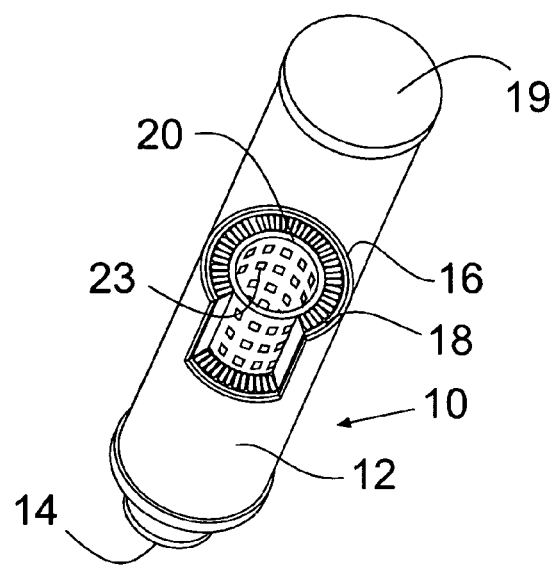
FIG. 1 shows a partial cross cross-section of a filter device having a conventional filter element.
Figure 2:
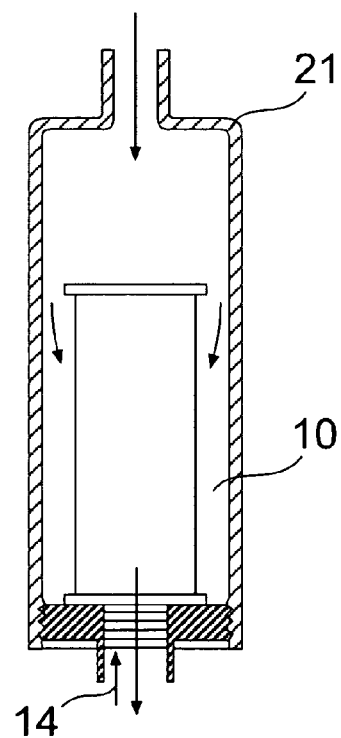
FIG. 2 shows a specific phase diagram showing a conventional filter device having a conventional filter element.
Figure 3:
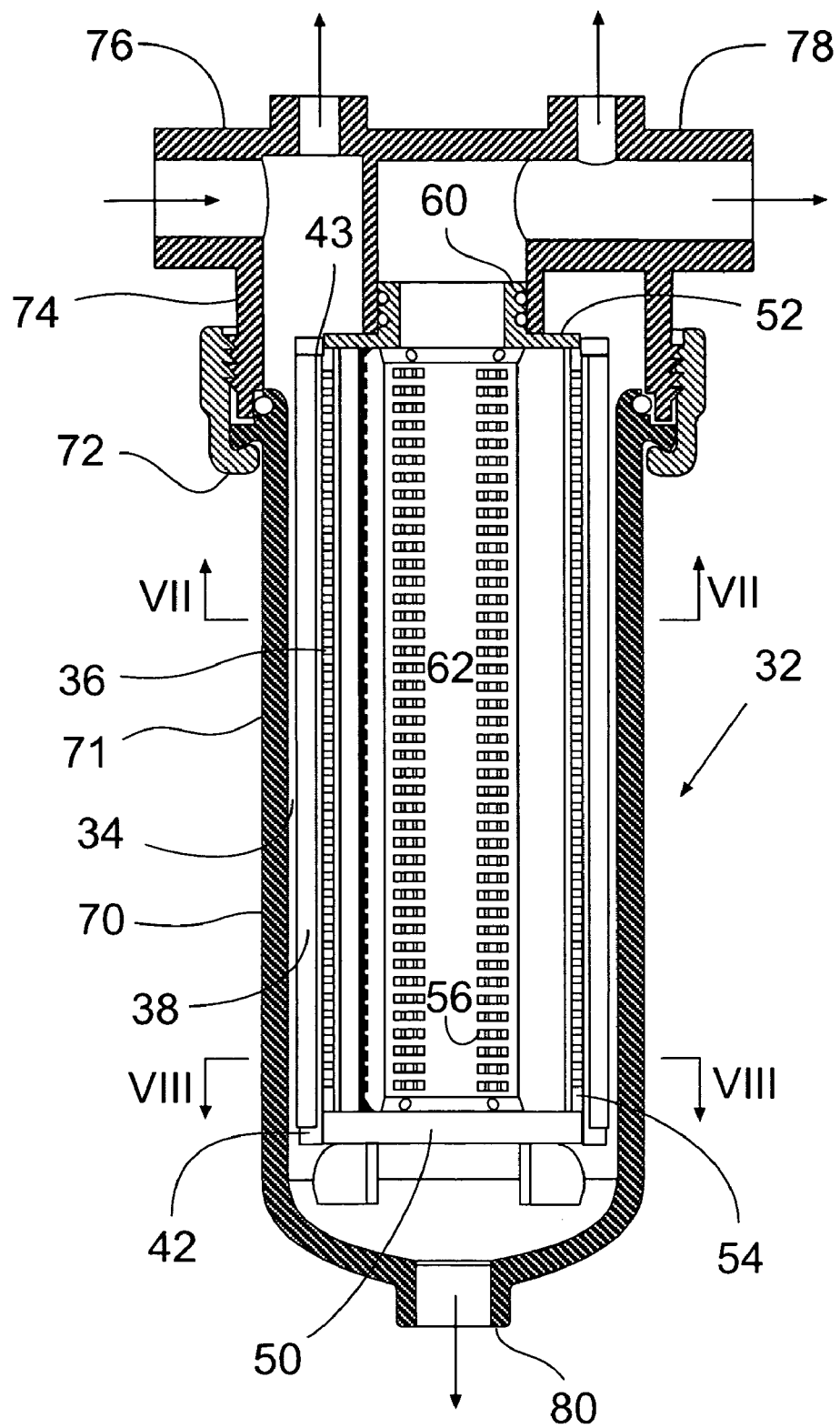
FIG. 3 shows a longitudinal section of a filter device into which a filter element of the present invention is fixed.
Figure 4:
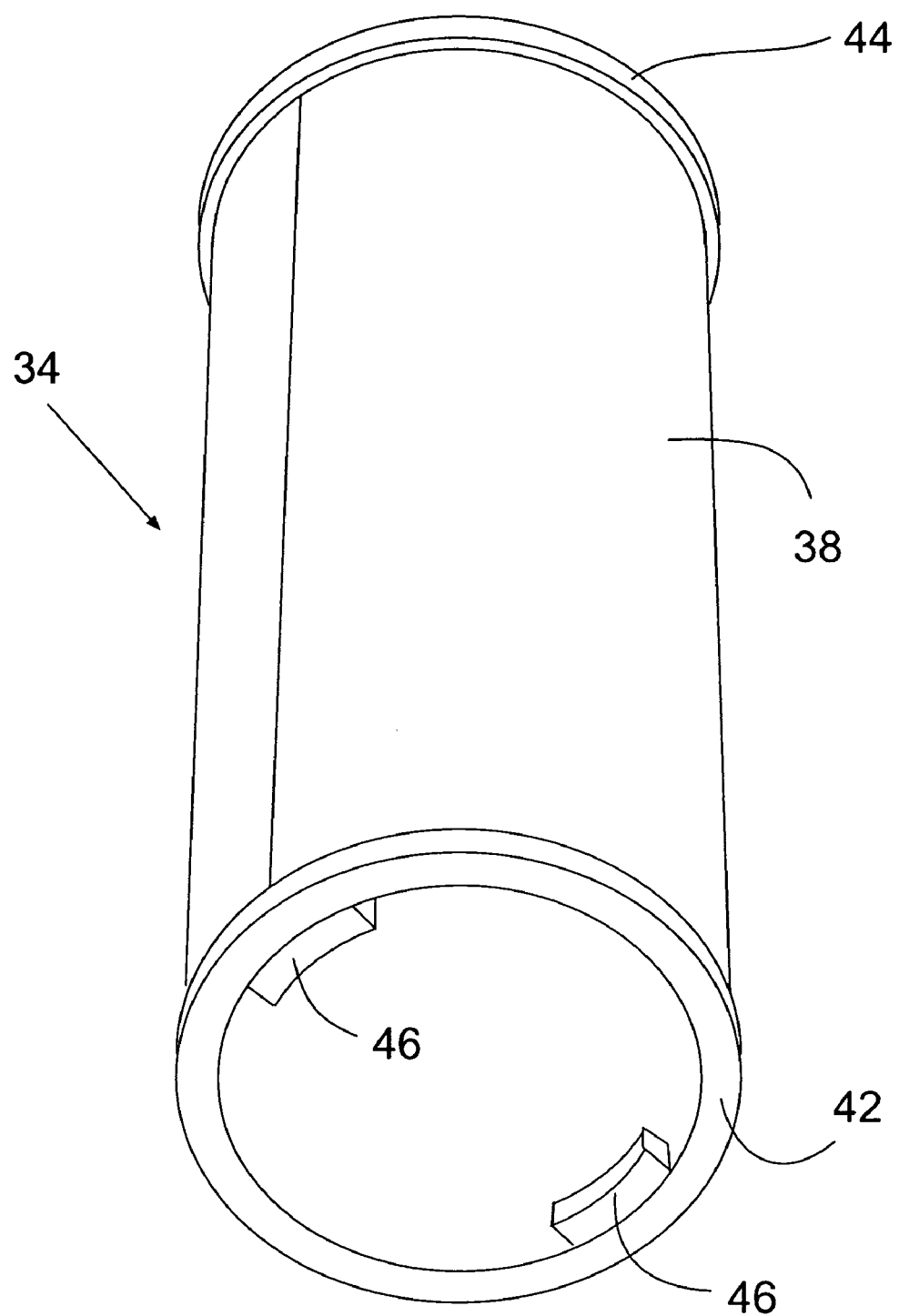
FIG. 4 shows a perspective view of the upstream filter that is a component of the filter element of the present invention.
Figure 5:
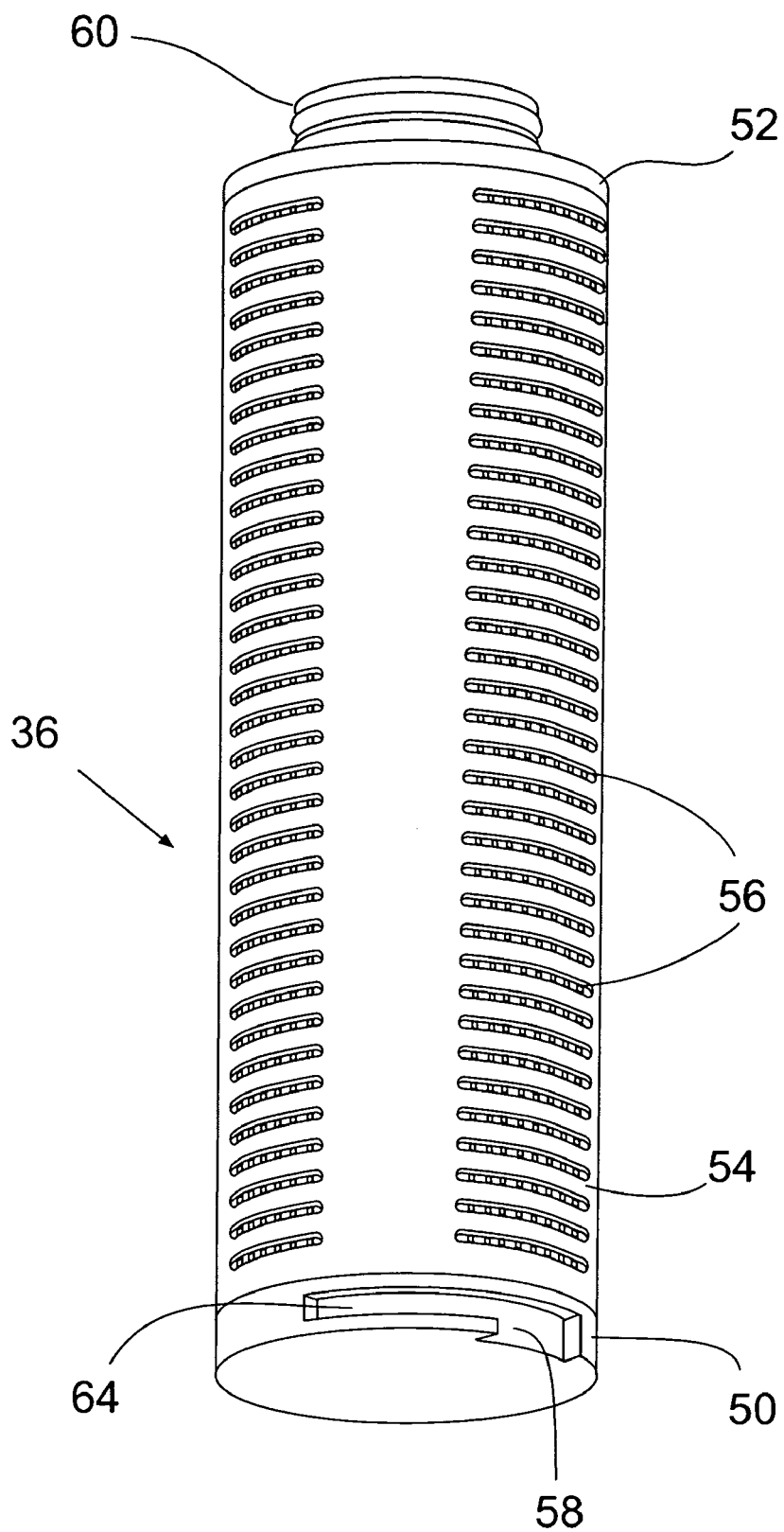
FIG. 5 shows a perspective view of the downstream filter that is a component of the Filter element of the present invention.
Figure 6:
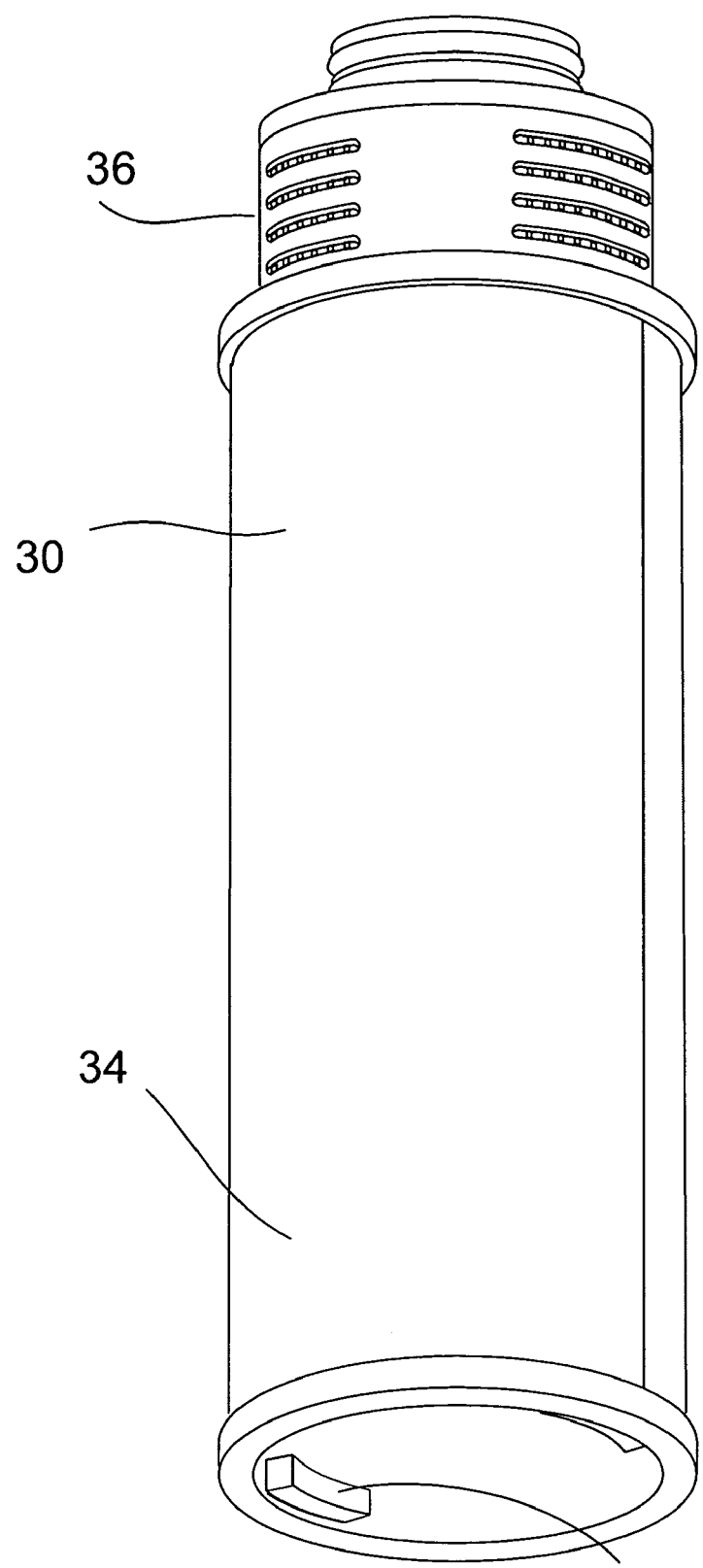
FIG. 6 shows a perspective view of one embodiment of the present invention in which the filter elements are combined.
Figure 7:
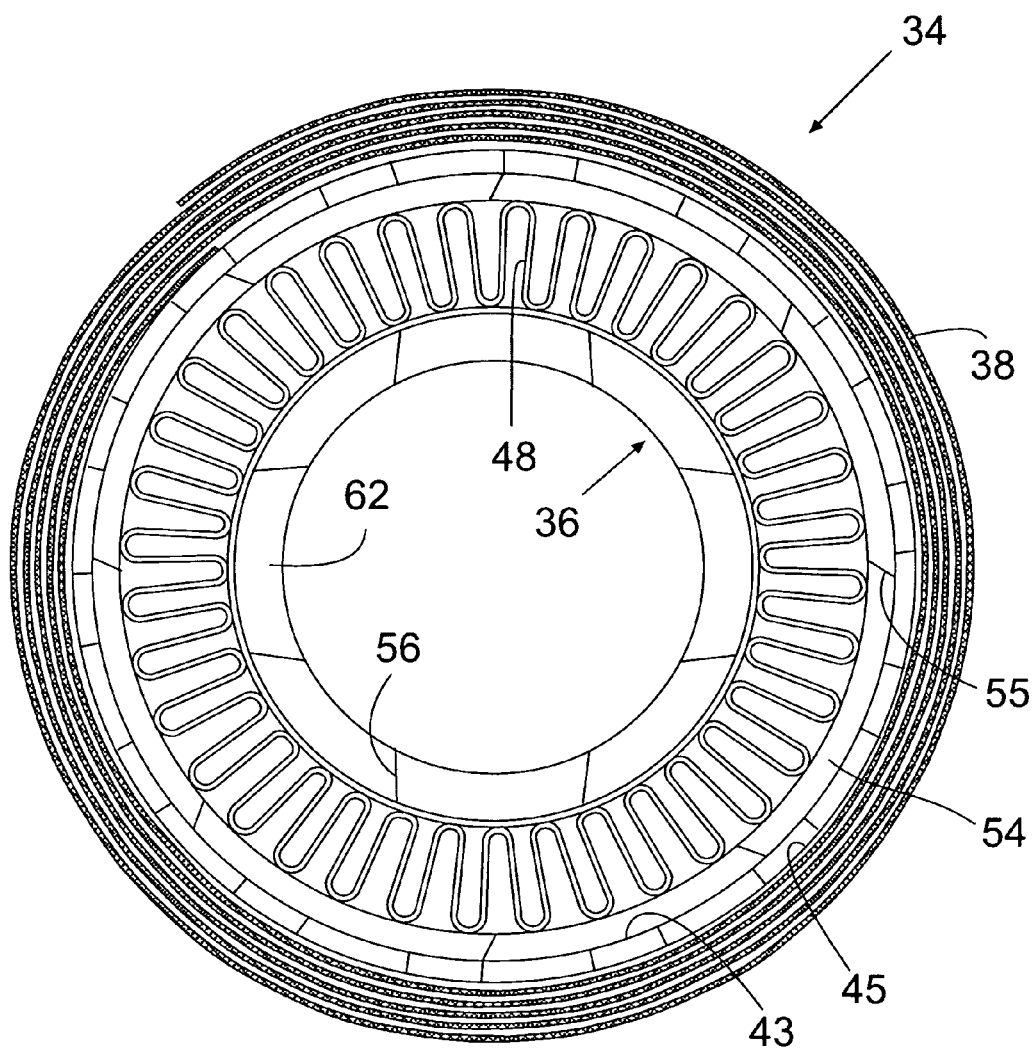
FIG. 7 shows a plane cross section along the line IV—IV in FIG. 3.
Figure 8:
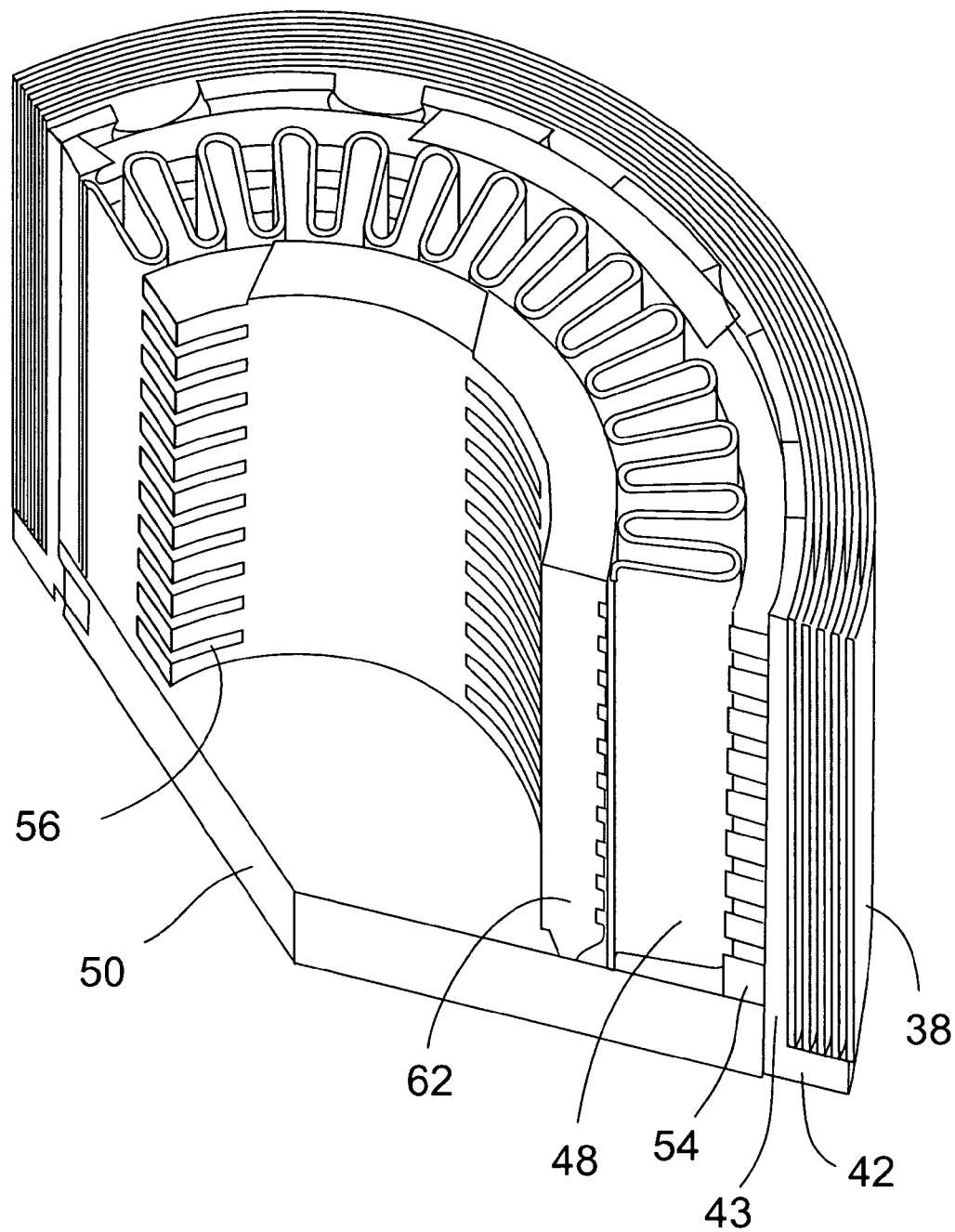
FIG. 8 shows a perspective view of the cross section of the filter element along the line VIII—VIII in FIG. 3.
Figure 9:
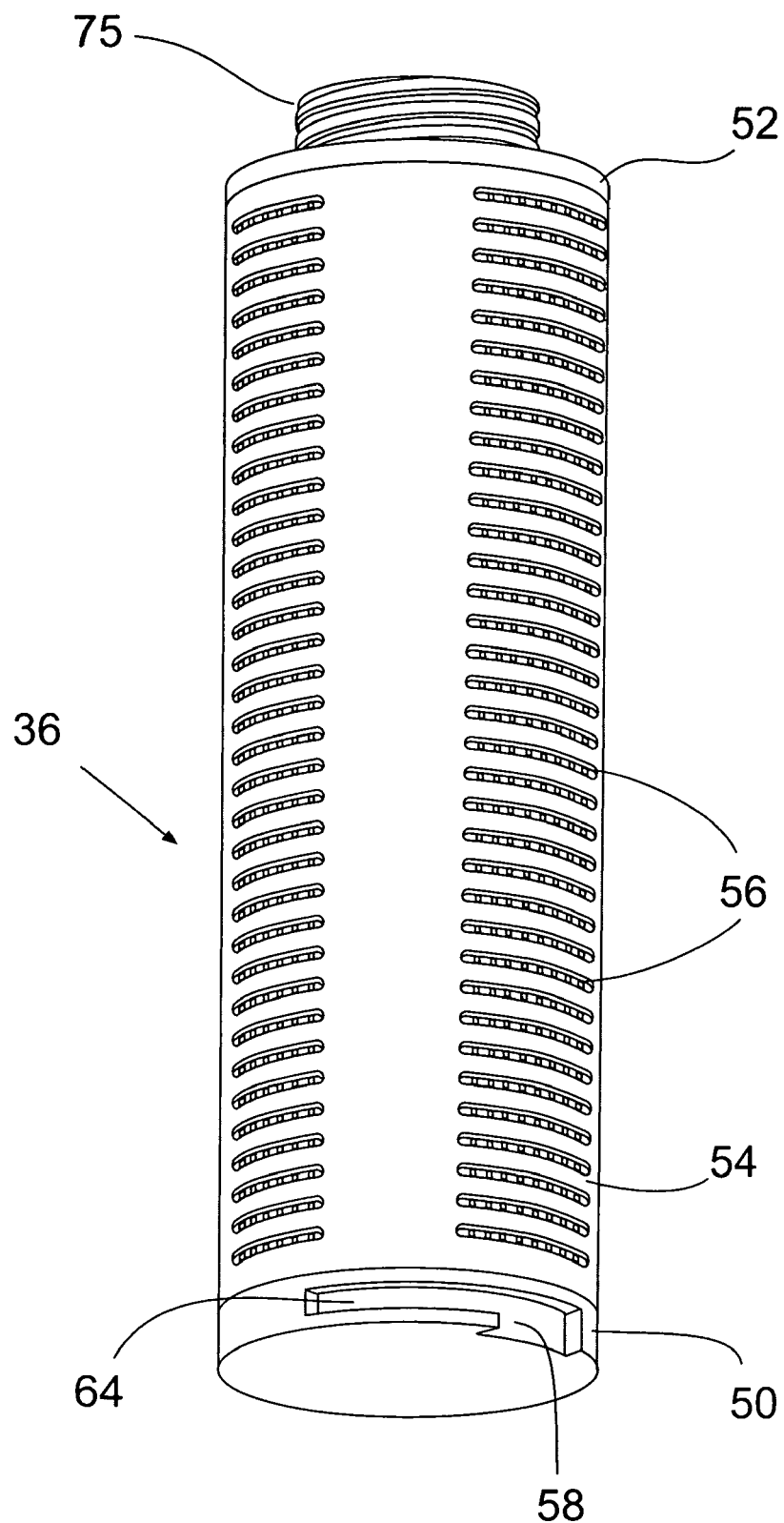
FIG. 9 and FIG. 10 show a further embodiment of the invention including a downstream filter having threaded filtrate outlet for connecting the downstream filter to the housing.
Figure 10:
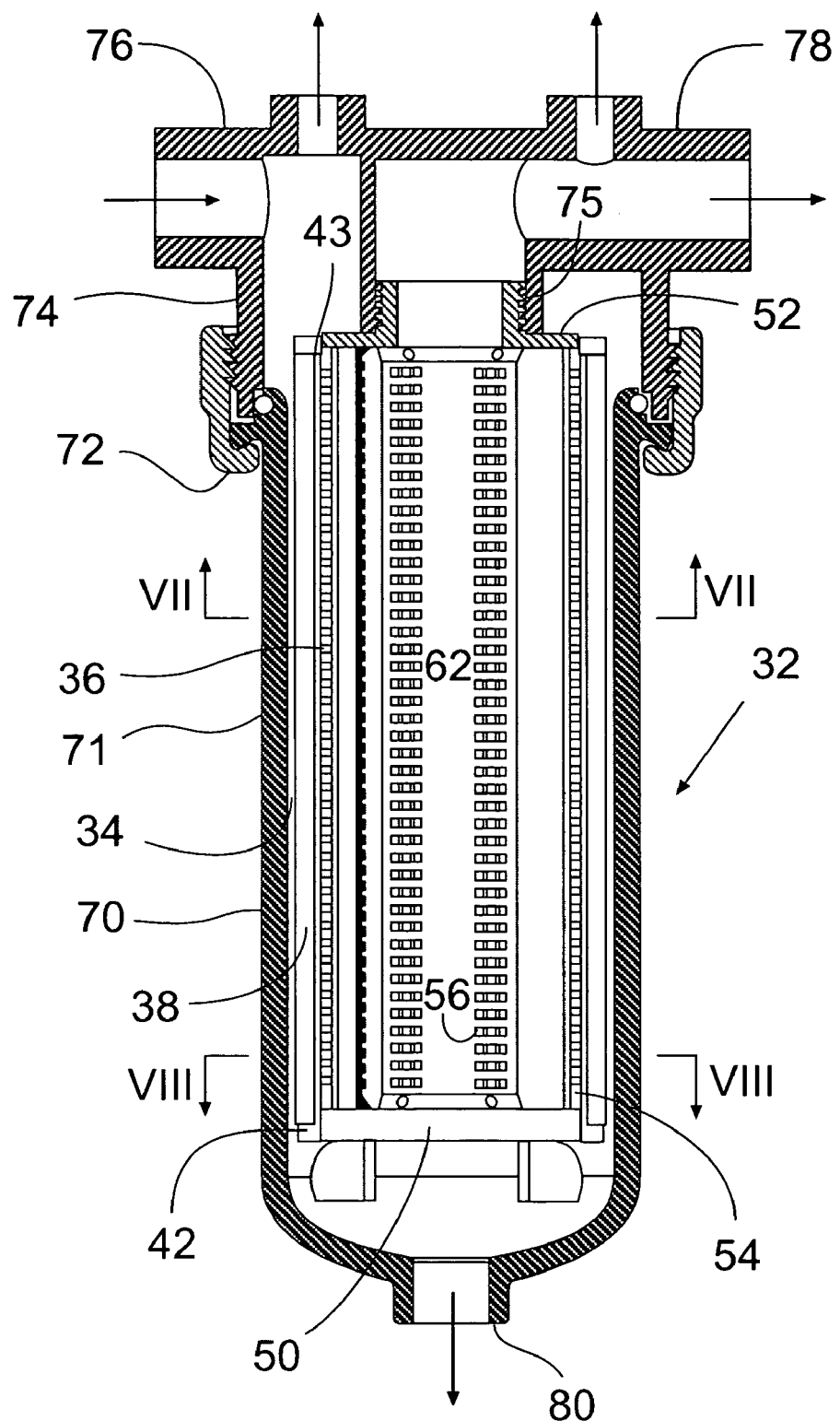

30 filter element
32 filter device
34 upstream filter
36 downstream filter
38 filter body
40 housing
42, 44 cap
46 projection
48 filter body
50, 52 cap
54, 62 support cylinder
56 circulatory hole
60 outlet
58 twist-lock groove
64 grommet groove

The invention claimed is:

1. A filter element comprising an upstream filter having a top end cap and a bottom end cap and a downstream filter having a top end cap and a bottom end cap, wherein the upstream filter and the downstream filter have cylindrical shapes such that the downstream filter is received within an interior of the upstream filter, wherein radially outer edges of the top and bottom end caps of the downstream filter are in respective contact with radially inner edges of the top and bottom end caps of the upstream filter, wherein an upper surface of the top end cap of said downstream filter has a filtrate outlet for fluidly connecting an interior of said downstream filter to the outlet of a housing, and wherein the radially outer peripheral edge of the bottom end cap of the downstream filter includes a twist-lock groove consisting of an axial groove and a circumferential groove extending from the axial groove, and wherein the radially inner peripheral edge of the lower end cap of the upstream filter includes a projection that is receivable within the axial and circumferential grooves of said twist-lock groove, whereby when the upstream filter is rotated and moved downwardly, said bottom end cap of the upstream filter is detachably fixable to the bottom end cap of said downstream filter.

2. The filter element according to claim 1, wherein said filtrate outlet includes a thread an O-ring for fixing the filter element to said housing.

3. The filter element according to claim 1 wherein the end caps of said upstream filter are loosely fit together with the end caps of said downstream filter.

4. The filter element according to claim 1 wherein the end caps of said upstream filter is are liquid-tightly fixed to end caps of said downstream filter.

5. The filter element according to claim 1 wherein said upstream filter is a rolled filter and said downstream filter is a pleated filter.

6. The filter element according to claim 1 wherein each of said upstream filter and downstream filter is selected respectively from different sets of filters.

\* \* \* \* \*